(12) United States Patent
Bourque et al.

(10) Patent No.: US 7,155,862 B2
(45) Date of Patent: Jan. 2, 2007

(54) SLIDING CLOSURE PANEL ASSEMBLY

(75) Inventors: Jeffrey Gerard Bourque, Novi, MI (US); Paul Joseph Kolokowski, Southgate, MI (US); Michael James Lesle, Toledo, OH (US); Lawrence R. Lyke, Novi, MI (US); Thomas William Payton, Jr., Allen Park, MI (US); Scott Saxon, Northville, MI (US); Marcus Tanksley, Farmington Hills, MI (US); Rick Mark Weinert, Novi, MI (US)

(73) Assignee: Automotive Components Holdings, LLC., Dearborn, MI (US)

( * ) Notice: Subject to any disclaimer, the term of this patent is extended or adjusted under 35 U.S.C. 154(b) by 148 days.

(21) Appl. No.: 10/715,249

(22) Filed: Nov. 17, 2003

(65) Prior Publication Data

US 2004/0098919 A1 May 27, 2004

Related U.S. Application Data

(60) Provisional application No. 60/429,805, filed on Nov. 27, 2002.

(51) Int. Cl.
*E05D 15/06* (2006.01)

(52) U.S. Cl. .............................. 49/413; 49/209; 49/380

(58) Field of Classification Search .................. 49/116, 49/208, 209, 380, 413
See application file for complete search history.

(56) References Cited

U.S. PATENT DOCUMENTS

| | | | |
|---|---|---|---|
| 349,268 A | 9/1886 | Becker | |
| 766,253 A | 8/1904 | Howe | |
| 1,275,531 A | 8/1918 | Clews | |
| 1,308,993 A | 7/1919 | Ridington | |
| 1,363,376 A | 12/1920 | Thommen | |
| 1,375,914 A | 4/1921 | Kimbark | |
| 1,384,904 A | 7/1921 | Lattimore | |
| 1,388,091 A | 8/1921 | Bresnahan | |
| 1,509,450 A | 9/1924 | Sweeney | |
| 1,569,118 A | 1/1926 | Curtis | |
| 1,593,324 A | 7/1926 | Anderson | |
| 1,595,274 A | 8/1926 | White | |
| 1,684,636 A | 9/1928 | Mendenhall | |
| 1,721,223 A | 7/1929 | Kern | |
| 1,859,392 A | 5/1932 | Harper | |
| 1,904,986 A | 4/1933 | Bredin | |
| 1,969,521 A | 8/1934 | Oman | |
| 2,530,724 A | 11/1950 | Pierson | |
| 2,629,466 A | 2/1953 | Nardulli | |
| 2,760,568 A | 8/1956 | Smiraldo | |

(Continued)

*Primary Examiner*—Jerry Redman
(74) *Attorney, Agent, or Firm*—MacMillan, Sobanski & Todd, LLC.

(57) ABSTRACT

A closure panel assembly (10) includes a fixed panel (12) defining an opening (14), a pair of guide rails (16,18) disposed on opposite sides of the opening, and a sliding panel (26) supported by the guide rails for movement between a closed position over the opening and an open position. Cooperating surface features (46,48) on at least one guide rail and the sliding panel engage one another when the sliding panel is moved to the closed position, to laterally displace the sliding panel toward the fixed panel and thereby compress a seal (44) disposed therebetween. Additional surface features (54) on the guide rail similarly engage the sliding panel's surface features to displace the sliding panel toward the fixed panel when the sliding panel is in a partially-open position, to thereby at least partially compress the seal and create a frictional drag on the sliding panel resisting further movement.

9 Claims, 1 Drawing Sheet

U.S. PATENT DOCUMENTS

| | | |
|---|---|---|
| 2,877,049 A | 3/1959 | Lucas |
| 3,130,456 A | 4/1964 | Migneault et al. |
| 3,189,390 A | 6/1965 | Elliott |
| 3,264,032 A | 8/1966 | Smith |
| 3,698,883 A | 10/1972 | Fazio |
| 3,805,872 A | 4/1974 | Lorber |
| 3,902,752 A | 9/1975 | Pelletier |
| 4,102,545 A | 7/1978 | Jay |
| 4,119,341 A | 10/1978 | Cook |
| 4,124,054 A | 11/1978 | Spretnjak |
| 4,227,725 A | 10/1980 | Lindquist et al. |
| 4,274,666 A | 6/1981 | Peck |
| 4,304,429 A | 12/1981 | Gist |
| 4,314,719 A | 2/1982 | Hawkins |
| 4,393,753 A | 7/1983 | Chatlos |
| 4,497,515 A | 2/1985 | Appelson |
| 4,571,888 A | 2/1986 | Jensen |
| 4,707,018 A | 11/1987 | Gavagan |
| 4,730,413 A | 3/1988 | Henry |
| 4,758,043 A | 7/1988 | Reynaldos |
| 4,911,348 A | 3/1990 | Rasor et al. |
| 4,934,098 A | 6/1990 | Prouteau et al. |
| 4,936,368 A | 6/1990 | Philbeck et al. |
| 5,129,678 A | 7/1992 | Gurbacki |
| 5,192,112 A | 3/1993 | Gherardi et al. |
| D354,937 S | 1/1995 | Netwich |
| 5,467,557 A | 11/1995 | Jones |
| 5,469,906 A | 11/1995 | Cason |
| 5,473,840 A | 12/1995 | Gillen et al. |
| 5,505,023 A | 4/1996 | Gillen et al. |
| 5,522,191 A | 6/1996 | Wenner et al. |
| 5,542,214 A | 8/1996 | Buening |
| 5,613,323 A | 3/1997 | Buening |
| 5,724,771 A | 3/1998 | Gipson |
| 5,771,637 A | 6/1998 | Oikawa et al. |
| 5,836,110 A * | 11/1998 | Buening ............... 49/360 |
| 5,996,284 A * | 12/1999 | Freimark et al. ............ 49/209 |
| 6,016,861 A | 1/2000 | Davis |
| 6,018,913 A | 2/2000 | Lin |
| 6,125,585 A | 10/2000 | Koneval et al. |
| 6,240,996 B1 | 6/2001 | Runions |
| 6,260,905 B1 | 7/2001 | Wagner |
| 6,276,426 B1 | 8/2001 | Polak |
| 6,305,125 B1 | 10/2001 | Nozaki et al. |
| 6,315,327 B1 | 11/2001 | Woolsey |
| 6,526,708 B1 | 3/2003 | Hartley et al. |
| 6,591,552 B1 | 7/2003 | Rasmussen |
| 2002/0148163 A1 | 10/2002 | Warner et al. |
| 2003/0137161 A1 | 7/2003 | Gillen |

* cited by examiner

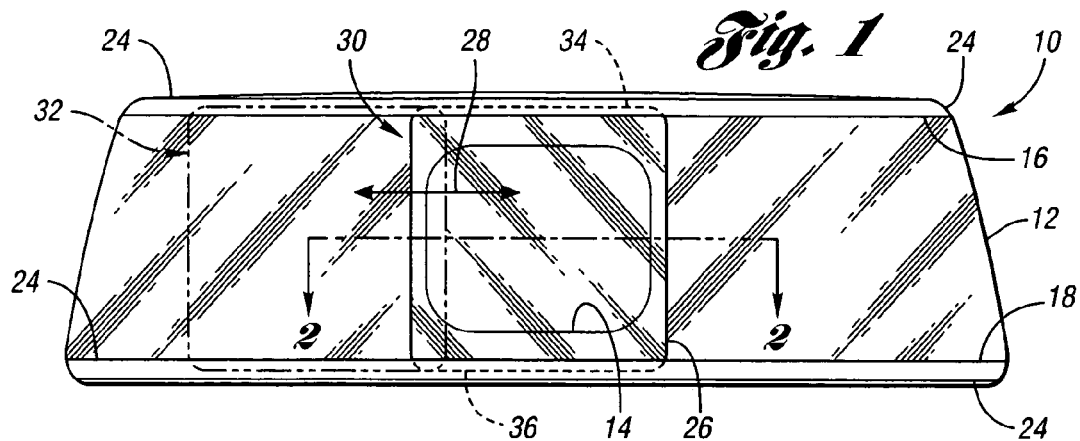
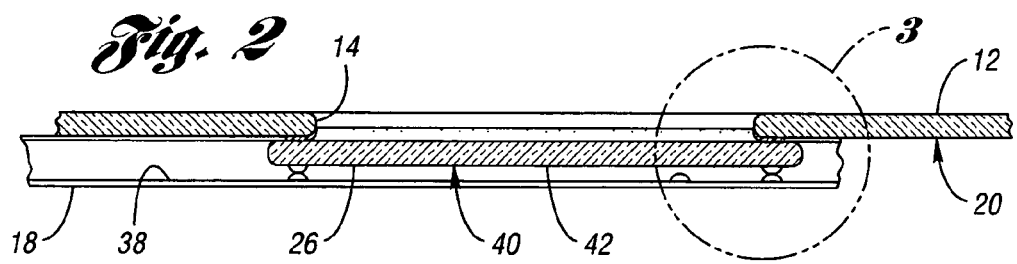
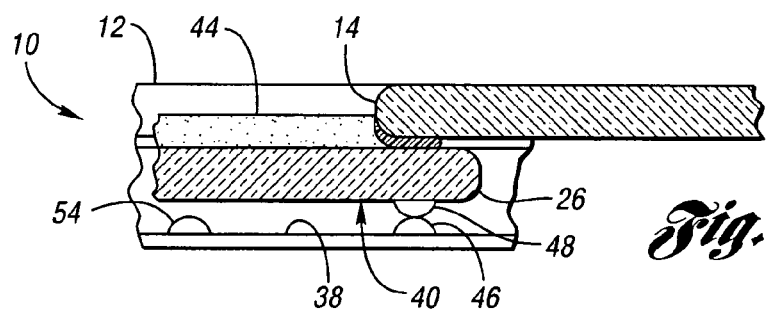
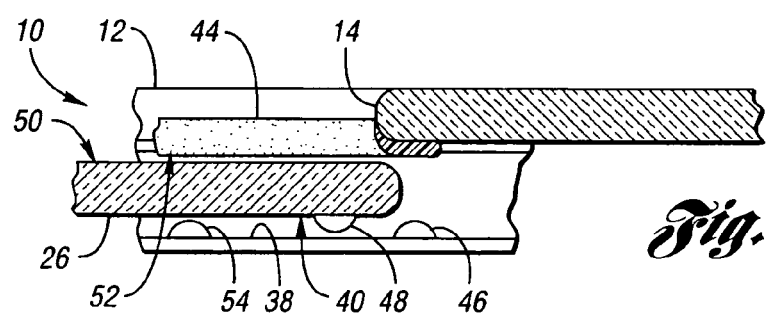
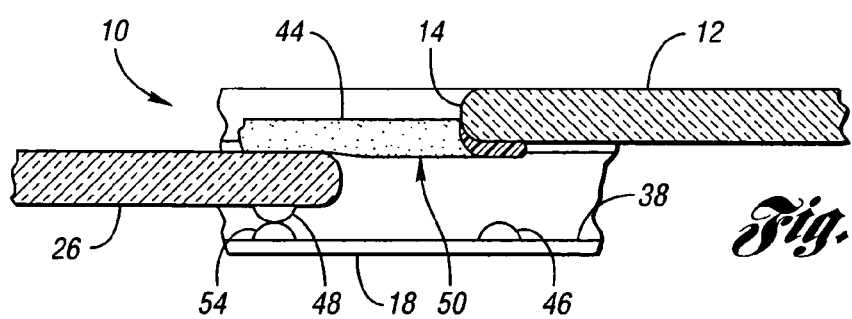

SLIDING CLOSURE PANEL ASSEMBLY

CROSS-REFERENCE TO RELATED APPLICATIONS

This application claims benefit of U.S. provisional patent application No. 60/429,805, filed Nov. 27, 2002, the disclosure of which is hereby incorporated herein by reference.

FIELD OF THE INVENTION

The invention relates generally to a closure panel assembly in which a movable or "sliding" panel is urged against a stationary or "fixed" panel to thereby compress an air or moisture seal disposed between opposed surfaces on the sliding panel and the fixed panel.

BACKGROUND OF THE INVENTION

A closure panel assembly, as is typically employed to define a rearward-facing window or "backlite" for a passenger compartment of a light truck, generally includes a fixed glass panel in which an opening is defined, and a sliding glass panel that moves along a pair of support or guide rails between a closed position and an open position relative to the opening. A compression seal is disposed between the fixed and sliding panels, for example, by mounting the seal about the periphery of the opening in the fixed panel. A lateral force, exerted on the sliding panel by the guide rails, ensures that the seal is compressed sufficiently to resist leakage of air and/or water between the fixed panel and the sliding panel when the sliding panel is moved to the closed position. Unfortunately, the lateral force exerted on the sliding panel by the guide rails typically generates a friction drag that resists free and easy movement of the sliding panel across the surface of the seal, thereby making it more difficult for a vehicle passenger to move the sliding panel between the closed and open positions.

What is needed is a means to incorporate a feature into the sliding panel and/or a guide rail to effect a desired compression of the seal disposed between the sliding panel and the fixed panel when the sliding panel is in the closed position, yet allow for sufficient unloading of the seal when the sliding panel is in the open position such that relatively free and easy sliding motion is effected.

BRIEF SUMMARY OF THE INVENTION

According to the invention, a closure panel assembly, for example, for closing a window opening defined in a motor vehicle or other enclosure, includes a sliding panel that is selectively movable, along a pair of panel guide rails disposed on generally opposite sides of the opening, between a closed position and an open position relative to the opening. In an exemplary embodiment, the opening is defined in a fixed panel, and the guide rails are affixed in a suitable manner to a face of the fixed panel such that the rails are disposed on opposite sides of the opening. A compression seal is provided on one of the sliding panel and the periphery of the opening, by which to achieve an air and/or moisture seal when the sliding panel is in the closed position.

Each guide rail generally includes an engagement portion that overlies a respective portion of the outer face of the sliding panel when the sliding panel is in or near the closed position relative to the opening. In an exemplary embodiment, the engagement portion is conveniently defined by a leg of a U-shaped or L-shaped guide rail that continuously overlies the respective portion of the sliding panel's outer face, i.e., whether the sliding panel is in the closed position, in the fully-open position, or in any intermediate partially-open position.

The engagement portion of at least one guide rail includes at least one and, preferably, a pair of first surface features projecting laterally in the general direction of the opening defined in the fixed panel. The portion of the outer face of the sliding panel further includes at least one and, preferably, a pair of second surface features that project laterally toward the engagement portion of the at least one guide rail. The first and second surface features engage each other when the sliding panel is moved into the closed position relative to the opening, whereupon the surface features operate to displace the sliding panel laterally toward the fixed panel to compress the seal.

In accordance with the invention, one of the first surface features on at least one guide rail is preferably positioned relative to the opening such that the one of the first surface features also engages a different one of the second surface features on the sliding panel as the sliding panel is moved into the fully-open position, whereupon the sliding panel is again displaced toward the fixed panel to thereby at least partially compress a portion of the seal. In this manner, the sliding panel is maintained in the fully-open position by the resilient partial compression of the seal while advantageously reducing noise that might otherwise result from relative lateral movement of the fully-open sliding panel within the guide rail.

In accordance with another aspect of the invention, in an exemplary embodiment, an additional, third surface feature is defined on one of the sliding panel and a guide rail, such that the third surface feature cooperates with one of the first and second surface features to displace the sliding panel towards the fixed panel when the sliding panel is in a partially-open position, whereby the seal is at least partially compressed to thereby maintain the sliding panel in the partially-open position, again, by increasing the frictional resistance to further relative movement of the sliding panel.

Other objects, features, and advantages of the present invention will be readily appreciated upon a review of the subsequent description of the preferred embodiment and the appended claims, taken in conjunction with the accompanying drawings.

BRIEF DESCRIPTION OF THE DRAWINGS

The accompanying Drawings incorporated in and forming a part of the specification illustrate several aspects of the invention and, together with the description, serve to explain the principles of the invention. In the Drawings:

FIG. 1 is an elevation of an exemplary closure panel assembly in accordance with the invention, illustrating, in solid lines, the sliding panel in a closed position relative to the fixed panel opening and, in broken lines, the sliding panel in a fully-open position relative to the fixed panel opening;

FIG. 2 shows a top view of a portion of the closure panel assembly of FIG. 1, illustrating the sliding panel in a closed position;

FIG. 3 is an enlarged view of the top view of FIG. 2, taken within circle 3 of FIG. 2;

FIG. 4 is an enlarged top view, similar to that of FIG. 3, showing the sliding panel moved away from the closed position to a first partially-open position relative to the fixed panel opening; and FIG. 5 is an enlarged top view, similar to that of FIG. 3, showing the sliding panel in a second partially-open position relative to the fixed panel opening.

DETAILED DESCRIPTION OF THE INVENTION

Referring to FIG. 1, an exemplary closure panel assembly 10 in accordance with the invention, as may be used as the backlight for a passenger vehicle such as a light truck (not shown), generally includes a fixed panel 12 which defines an opening 14. The fixed panel 12 is preferably formed of a relatively rigid material and, where desired, may be formed of a transparent or translucent material such as a tempered glass, as illustrated in the Figure. The opening 14 thus provides access to the interior/exterior of the passenger compartment of the vehicle.

The assembly 10 includes a pair of support or guide rails 16, 18 affixed to the fixed panel 12 on generally opposite sides of the opening 14. While the invention contemplates affixing or attaching the guide rails 16, 18 to the fixed panel 12 in any suitable manner, in the assembly 10 illustrated in the Drawings, the guide rails 16, 18 are conveniently affixed to a first face 20 of the fixed panel 12 with a pressure-sensitive adhesive, such as structural bonding tape (not shown). Where desired, the longitudinal ends 24 of each guide rail 16,18 is advantageously extended to the edges of the assembly 10, for example, such that the ends 24 are captured in a peripheral injection-molded urethane gasket (not shown), whereby the guide rails 16,18 are further secured to the vehicle.

Referring again to FIG. 1, the assembly 10 includes a sliding panel 26 arranged for movement, in a direction 28 generally parallel to each of the guide rails 16,18, between a closed position substantially covering or in alignment with the opening 14 (illustrated solid lines 30 in FIG. 1) and an open position wherein at least a portion of the opening 14 is exposed (illustrated in broken lines 32 in FIG. 1). More specifically, in the assembly 10, the sliding panel's upper and lower edges 34,36 are received within the respective first and second guide rails 16,18, such that the movement of the sliding panel is generally constrained by the guide rails 16,18 to allow the sliding panel 26 to "slide" between the closed position and the open position.

As best illustrated in FIG. 2 with respect to the lower guide rail 16, each guide rail 16,18 generally includes an engagement portion 38 that overlies a respective portion 40 of the outer face 42 of the sliding panel 26, at least when the sliding panel 26 is in or near the closed position relative to the opening 14. While the invention contemplates a variety of guide rail configurations, including those that define the engagement portion 38 with two or more discontinuous, longitudinally-spaced guide elements (not shown), in the assembly 10 illustrated in the Drawings, each rail 16,18 is conveniently formed as a continuous U-shaped aluminum extrusion that overlies the respective portion 40 of the sliding panel's outer face 42 without regard to the sliding panel's relative position, i.e., when the sliding panel 26 is in the closed position, in the fully-open position, and any position in between the open and closed positions. By way of further example, the invention similarly contemplates use of a guide rail of relatively limited longitudinal dimension, whereby the engagement portion of the guide rail overlies only a portion of the sliding panel's respective edge 34,36 at a given time.

Also as seen in FIG. 2, a compression seal, such as a bulb seal 44 formed of an extruded EPDM material, is secured about the periphery of the opening 14, as by a suitable adhesive (not shown), with which to achieve an air and/or moisture seal between the fixed panel 12 and the sliding panel 26 when the sliding panel 26 is moved into the closed position. It will be appreciated that the invention contemplates use of other types of compressible seals with which to form a desired seal between the fixed panel 12 and the sliding panel 26, including those seals that are affixed to the sliding panel 26 rather than the periphery of the opening 14.

As best seen in the enlarged view shown in FIG. 3, the engagement portion 38 of the lower guide rail 18 includes a pair of first surface features 46 projecting laterally in the general direction of the opening 14 defined in the fixed panel 12, roughly aligned with the outboard edges of the bulb seal 44. The portion 40 of the outer face 42 of the sliding panel 26 in opposition with the engagement portion 38 of the lower guide rail 18 includes a pair of second surface features 48 that project laterally toward the engagement portion 38 of the lower guide rail 18. The pairs of first and second surface features 46,48 engage each other when the sliding panel 26 is moved into the closed position relative to the opening 14, whereupon the now-opposed surface features 46,48 operate to displace the sliding panel 26 laterally toward the fixed panel 12 into engagement with the bulb seal 44 and, further, slightly compressing the bulb seal 44 to thereby achieve a weather-tight seal between the sliding panel 26 and the fixed panel 12.

Preferably, because the guide rails 16,18 are more difficult to replace than the sliding panel 26, the surface features 46 on the assembly's lower guide rail 18 preferably exhibit a greater wear-resistance than the surface features 48 defined on the outer face 42 of the sliding panel 26. And, while the invention contemplates defining the surface features 46,48 in any suitable manner, as by forming the surface features integrally with the guide rail 18 or the sliding panel 26, in the exemplary assembly 10, the surface features 46,48 are conveniently defined by separate elements that are secured as with a suitable adhesive to the respective portions 38,40 of the guide rail 18 and sliding panel 26.

In the case of the exemplary assembly 10, the separate elements defining the first and second surface features 46,48 are conveniently formed of 6/6 Nylon, which further ensures that the first surface features 46 on the lower guide rail 18 will not mar the glass material of the sliding panel 26 in use. It will also be appreciated that, while the surface features 46,48 of the exemplary assembly 10 are generally semi-spherical, other shapes or combinations of shapes may be used, including "ramps," or a "hills and valley" configuration by which to define a self-centering "detent" position. Other locations for the surface features are likewise contemplated by the invention, for example, a single pair of surface features 46,48 centered along the bottom edge 36 of the sliding panel 16 when the sliding panel 26 is in the closed position.

As seen in the enlarged view of FIG. 4, when the sliding panel 26 is moved from the closed position, the respective pairs of first and second surface features 46,48 disengage, and the sliding panel 26 is free to move laterally away from the fixed panel 12, such that the inner face 50 of the sliding panel 26 is no longer pressed against the surface 52 of the bulb seal 44 (although intermittent contact between the inner face 50 of the sliding panel 26 and the surface 52 of the bulb seal 44 may still occur, as when stopping the vehicle). In this manner, a free and easy sliding relative movement of the sliding panel 26 is permitted, once the sliding panel 26 has been moved from the closed position.

In accordance with a feature of the invention, the surface features 46,48 are preferably positioned on the engagement portion 38 of the lower guide rail 18, and on the opposed portion 40 of the sliding panel 26, such that one of the first surface features 46 engages another of the second surface features 48 as the sliding panel 26 is moved into the fully-open position. The sliding panel 26 is again displaced by such surface feature engagement toward the fixed panel 12 to thereby at least partially compress a portion of the bulb seal 44. In this manner, the sliding panel 26 is advantageously maintained in the fully-open position by resilient seal compression while further reducing noise that might otherwise result from relative lateral movement of the fully-open sliding panel 26 within the lower guide rail 18.

As best illustrated in FIG. 5, the exemplary assembly 10 also features an additional, third surface feature 54 defined on the engagement portion 38 of the lower guide rail 18. The third surface feature 54 cooperates with one of the second surface features 48 to displace the sliding panel 26 towards the fixed panel 12 when the sliding panel 26 is in a partially-open position (characterized by a partial covering of the opening 14 with the sliding panel 26). In this manner, the bulb seal 44 is at least partially compressed to thereby maintain the sliding panel in the partially-open position, again, by increasing the frictional resistance to further relative movement of the sliding panel 26.

While the above description constitutes the preferred embodiment, it will be appreciated that the invention is susceptible to modification, variation and change without departing from the proper scope and fair meaning of the subjoined claims. For example, while the guide rails 16,18 of the exemplary closure panel assembly 10 described above are disposed above and below the opening 14 in the fixed panel 12, respectively, it will be appreciated that, where the sliding panel is to be deployed vertically, for example, as might be preferably in the case of a bus window or a closure panel assembly on a fixed structure such as a house, the invention contemplates placement of the guide rails on the laterally opposite sides of the opening. Similarly, while the surface features 46,48,54 of the exemplary assembly 10 are provided on the lower guide rail 18 and the lower edge 36 of the sliding panel 26 to ensure engagement (as gravity will ensure that the sliding panel 26 remains seated within the lower guide rail 18), the invention contemplates providing surface features 44,46,54 along the top edge 34 of the sliding panel 26.

A handle and latch (not shown) may also be secured to one of the sliding panel and the fixed panel, wherein the latch is operative to secure the sliding panel against relative movement when the sliding panel is in the closed position, and, perhaps, one or more additional relative positions of the sliding panel other than the closed position.

We claim:

1. A closure panel assembly for closing an opening defined in a fixed panel, the assembly comprising:
    a pair of guide rails affixed to the fixed panel on generally opposite sides of the opening; and
    a sliding panel having an outer face, and a first and second edge bordering the outer face, the first and second edges being respectively disposed within the first and second guide rails such that the first and second guide rails guide the movement of the sliding panel between a closed position generally covering the opening and an open position displaced in a first direction from the closed position; and
    a compression seal on one of the sliding panel and a periphery of the opening,
    wherein at least one of the guide rails generally includes an engagement portion that overlies a portion of the outer face of the sliding panel when the sliding panel is in or near the closed position, the engagement portion including at least one first surface feature projecting laterally in the general direction of the opening defined in the fixed panel, and
    wherein the portion of the outer face of the sliding panel includes at least one second surface feature projecting laterally toward the engagement portion of the one guide rail, the first and second surface features engaging each other when the sliding panel is moved into the closed position to displace the sliding panel laterally toward the fixed panel to compress the seal about the periphery of the opening directly between the fixed panel and the sliding panel, and further wherein the second surface feature is disengaged from the guide rails and the first surface feature when away from the closed position whereby the sliding panel is displaceable away from the fixed panel when positioned between the fully-opened and closed positions.

2. The assembly of claim 1, wherein the engagement portion of the one guide rail includes a pair of first surface features positioned relative to the opening such that one of the pair of first surface features engages a selected second surface feature on the sliding panel when the sliding panel is in the closed position, and the other of the pair of first surface features engages the selected second surface feature on the sliding panel when the sliding panel is in the fully-open position.

3. The assembly of claim 2, wherein engagement of the other of the pair of first surface features and the selected second surface feature displaces the sliding panel toward the fixed panel to at least partially compress only a portion of the periphery of the seal.

4. The assembly of claim 2, wherein a third surface feature is defined on the one guide rail, the third surface feature engaging the selected second surface feature on the sliding panel to displace the sliding panel towards the fixed panel when the sliding panel is in a partially-open position between the closed position and the open position.

5. The assembly of claim 4, wherein engagement of the third surface feature and the selected second surface feature displaces the sliding panel toward the fixed panel to at least partially compress only a portion of the periphery of the seal.

6. The assembly of claim 1, wherein the engagement portion of the one guide rail continuously overlies the portion of the outer face of the sliding panel.

7. The assembly of claim 1, wherein the sliding panel is formed of glass, and wherein the at least one first surface feature on the engagement portion of the one guide rail is formed of a non-marring material.

8. The assembly of claim 7, wherein the at least one first surface feature is formed of a plastic material.

9. A closure panel assembly for closing an opening defined in a fixed panel, the assembly comprising:
    a pair of guide rails affixed to the fixed panel on generally opposite sides of the opening; and
    a sliding panel having an outer face, and a first and second edge bordering the outer face, the first and second edges being respectively disposed within the first and second guide rails such that the first and second guide rails guide the movement of the sliding panel between a closed position generally covering the opening and an open position displaced in a first direction from the closed position; and a compression seal on one of the sliding panel and a periphery of the opening, wherein at least one of the guide rails generally includes an engagement portion that overlies a portion of the outer face of the sliding panel when the sliding panel is in or near the closed position, the engagement portion of the one guide rail including at least one pair of first surface features projecting laterally in the general direction of the opening defined in the fixed panel, and wherein the portion of the outer face of the sliding panel includes a selected second surface feature projecting laterally toward the engagement portion of the one guide rail, the first pair of surface features and the second selected surface feature positioned relative to the opening such that one of the pair of first surface features engages the selected second surface feature on the sliding panel when the sliding panel is moved into the closed position to displace the sliding panel laterally toward the fixed panel to compress the seal about the periphery of the opening between the fixed panel and the sliding panel, and the other of the pair of first surface features engages the selected second surface feature on the sliding panel when the sliding panel is in the fully-open position to displace the sliding panel laterally toward the fixed panel to at least partially compress a portion of the seal about the periphery directly between the fixed panel and the sliding panel, and further wherein the second surface feature is disengaged from the guide rails and the first surface feature when away from the closed position whereby the sliding panel is displaceable away from the fixed panel when positioned between the fully-opened and closed positions.

* * * * *